United States Patent [19]
Augustsson

[11] Patent Number: 6,047,096
[45] Date of Patent: Apr. 4, 2000

[54] OPTICAL DEVICE

[75] Inventor: Torsten Augustsson, Upplands Väsby, Sweden

[73] Assignee: Telefonaktiebolaget LM Ericsson, Stockholm, Sweden

[21] Appl. No.: 09/033,092

[22] Filed: Mar. 2, 1998

[51] Int. Cl.[7] .................................................. G02B 6/34
[52] U.S. Cl. ............................................................ 385/37
[58] Field of Search .................................. 359/341, 337, 359/124, 566; 372/6; 385/27, 37, 48, 43, 96, 12

[56] References Cited

U.S. PATENT DOCUMENTS

| | | | |
|---|---|---|---|
| 5,093,876 | 3/1992 | Henry et al. | 395/28 |
| 5,420,948 | 5/1995 | Byron | 385/37 |
| 5,608,571 | 3/1997 | Epworth et al. | 359/341 |
| 5,633,965 | 5/1997 | Bricheno et al. | 385/37 |
| 5,638,473 | 6/1997 | Byron | 385/37 |

FOREIGN PATENT DOCUMENTS

| | | |
|---|---|---|
| 0652452A1 | 5/1995 | European Pat. Off. . |
| 0706270A1 | 4/1996 | European Pat. Off. . |
| 0713110A1 | 5/1996 | European Pat. Off. . |
| 2930681A1 | 2/1981 | Germany . |
| 96/08044 | 3/1996 | WIPO . |
| 96/24871 | 8/1996 | WIPO . |

OTHER PUBLICATIONS

"Optical Multi–Mode Interference Devices Based on Self–Imaging: Principles and Applications", Lucas B. Soldano and Erik C.M. Pennings, Journal of Lightwave Technology, vol. 13, No. 4, Apr. 1995.

"Optical Bandwidth and Fabrication Tolerances of Multi-mode Interference Couplers", Pierre A. Besse, Maurus Bachmann, H. Melchior, L.B. Soldano and M.K. Smit, Journal of Lightwave Technology, vol. 12, No. 6, Jun. 1994.

Primary Examiner—Akm E. Ullah
Attorney, Agent, or Firm—Burns, Doane, Swecker & Mathis, L.L.P.

[57] ABSTRACT

The present invention relates to an optical device that includes at least one MMI-waveguide and at least one Bragg-grating structure. At least one so-called access waveguide is disposed on a first side of the MMI-waveguide and at least one access waveguide is disposed on a second side of the MMI-waveguide, wherein the first and second sides are the short sides of the MMI-waveguide. The access waveguide has a so-called taper structure and the Bragg-grating structure is arranged in the MMI-waveguide.

8 Claims, 4 Drawing Sheets

OPTICAL DEVICE

FIELD OF INVENTION

The present invention relates to an optical wavelength selective device, and then particularly to a device for multiplexing/demultiplexing optical transmission channels in an optical network, such as an add/drop multiplexor.

BACKGROUND OF THE INVENTION

A number of different methods of increasing the capacity of existing optical fibres in a network are known to the art. One method is to use wavelength division multiplexing (WDM) to improve the extent to which available bandwidths can be utilized on the optical fibre in the optical network. However, this technique requires the provision of means that can multiplex and demultiplex transmission channels that lay on different so-called optical carrier wavelengths in the optical network.

One type of multiplexing of particular interest with regard to so-called bus networks or ring networks is add/drop multiplexing, i.e. a process in which one or more so-called information channels disposed on the aforesaid carrier wavelengths are dropped from or added to an information flow.

SUMMARY OF THE INVENTION

It is known that the capacity of an optical transmission system can be increased in many different ways. For instance, in wavelength multiplexing, transmission channels are multiplexed and demultiplexed on different carrier wavelengths to obtain an information flow.

High power losses in respect of both add/drop channels and of transmission channels is an example of one problem encountered with known techniques.

Another problem is one of maintaining an acceptable channel cross-talk level.

The present invention attacks these problems with the aid of an optical device that includes at least one MMI-structure, at least one Bragg-grating, and at least two so-called access waveguides for connection to external optical devices or optical fibres.

The aforesaid MMI-structure (Multi Mode Interference) has the ability of enabling light intensity distribution at one of the inputs of the MMI-structure to be imaged on all outputs of said MMI-structure. MMI-structures can therefore be used to split light. In the case of the present invention, the length of the MMI waveguide is chosen to obtain 1:1 imaging, in other words in the optimal case all light incoming from a first access waveguide provided on the MMI waveguide is focused out on a second access waveguide disposed on the opposite side relative to the first access waveguide. A more fundamental theory behind MMI-structures is treated in Patent Specification DE 2506272 and in L. B. Soldano and E. C. M. Pennings, "Optical Multi-Mode Interference Devices Based on Self-Imaging: Principles and Application", J. Lightwave Technol., Vol. 13(4), pp. 615–627, 1995.

Bragg-grating is used to filter light. This filtering process involves permitting light of certain wavelengths to pass through the grating while reflecting light of other wavelengths. A Bragg-grating can be said to constitute some form of wavelength selective mirror. Reflection of certain wavelengths can be achieved in several different ways. However, it is typical of such methods that reflection takes place by changing a so-called material index periodically in the waveguide.

The inventive device may also include a so-called phase control element. The phase control element influences a so-called optical wavelength in a waveguide. This is effected by applying an external signal to the waveguide.

One method of achieving said phase control is to subject the waveguide to an electric field that changes the effective refraction index in the waveguide.

The phase control can also be achieved by subjecting the waveguide to thermal changes.

One method of permanently changing the index in a waveguide is to expose the waveguide to ultraviolet light. This is normally referred to as the waveguide being UV-written. The technique is most often used to achieve periodic refractive index variation, so-called UV-writing. The technique can also be used for adjusting or trimming purposes.

The aforesaid filtration methods and methods of effecting phase control in a waveguide are only given by way of example and do not therefore exclude the application of unmentioned methods in respect to the invention.

The invention includes an MMI-structure in which a Bragg-grating is arranged. The Bragg-grating is preferably arranged in the centre of the MMI-structure. Access waveguides are provided on the MMI-structure. The placement of these access waveguides on the MMI-structure is decisive to the function of the optical device. The invention solves the aforesaid problem, by virtue of a number of different embodiments of the MMI-structure on the one hand and of the access waveguides together with the Bragg-grating on the other.

The object of the present invention is thus to provide an optical device that has smaller power losses, less channel cross-talk and smaller power variations between different transmission channels in comparison with known technology.

One advantage afforded by the present invention is that the device is more compact that known devices.

Another advantage is that the inventive optical device can be produced relatively cheaply.

The invention will now be described in more detail with reference to preferred embodiments thereof and also with reference to the accompanying drawings.

DETAILED DESCRIPTION OF PREFERRED EMBODIMENTS

Figure 1:
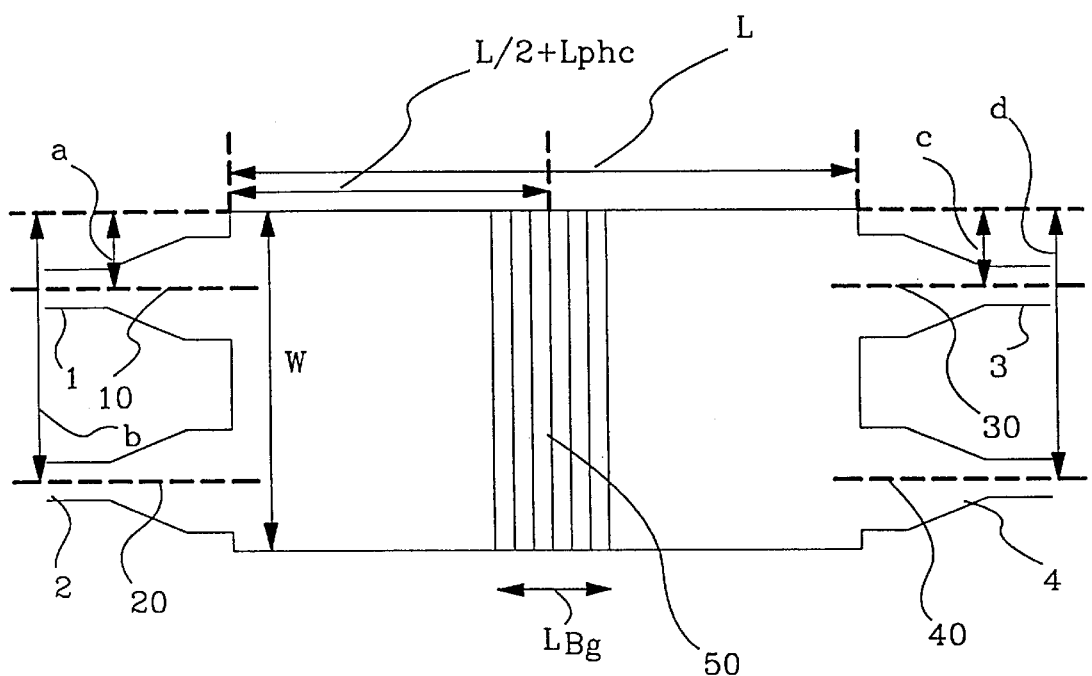
FIG. 1 illustrates an embodiment of an optical wavelength selective device according to the invention.

FIG. 1 illustrates an embodiment of an inventive optical wavelength selective device. The optical wavelength selective device includes a Bragg-grating 50 and an MMI-waveguide. The Bragg-grating 50 may be arranged in the MMI-waveguide so that its centre line coincides with the centre line of the MMI-waveguide. As evident from FIG. 1, the Bragg-grating may also be arranged at a distance of L/2+Lphc from one short side of the MMI-waveguide, where Lphc indicates said displacement from the centre of the MMI-waveguide. Lphc may either be positive or negative. The Bragg-grating is offset from the centre of the MMI-waveguide so as to compensate out the mode-dependent phase shift that would otherwise threaten the function of the device. The Bragg-grating has a given width, referenced LBg. The MMI-waveguide has a given length, which is referenced L in FIG. 1.

So-called access waveguides 1, 2, 3, 4 may be provided on the short sides of the MMI-waveguide. The FIG. 1 embodiment includes four access waveguides, i.e. two access waveguides on each short side. The number of access waveguides may vary from one embodiment to another, depending on the intended use of the optical wavelength selective device. The centre lines 10, 20, 30 and 40 of the access waveguides have been shown in the Figure. The distance from one long side of the MMI-waveguide to the centre line 10 of the access waveguide 1 is referenced a in FIG. 1. The distance from the same said long side of the MMI-waveguide to the centre line 20 of the access waveguide 2 is referenced b in FIG. 1. Similarly, the distance from said long side of the MMI-waveguide to remaining access waveguides 3 and 4 is referenced c and d respectively. The distances a and c may be equal and the distances b and d may also be equal. The distances a, b, c and d will depend on the effective width We of the MMI-waveguide, the number of images and the type of MMI-waveguide concerned. A profound theory behind different MMI-waveguides is treated in an article by Pierre A. Besse et al, entitled Optical Bandwidth and Fabrication Tolerances of Multimode Interference Couplers, J. Lightwave Technology, Vol. 12(4), pp. 1004–1009, 1994.

The effective width We of the MMI-waveguide depends on the wavelength $\lambda$, the refractive index step in the MMI-waveguide, the physical width of the MMI-waveguide and the polarization of the light.

The length of the MMI-waveguide will depend on the effective width We of said waveguide and the desired power.

In the FIG. 1 embodiment, the access waveguides are broader at their connections to the MMI-waveguide than at their free ends. This structure is normally referred to as a tapered structure. The effect of this structure is to change the optical field in comparison with a straight access waveguide. This results in a larger error tolerance with respect to error correction of the access waveguides. In addition, the effect will lie to a great extent in the lower order modes, which is beneficial because the Bragg-grating will give a mode-dependent phase shift for reflected channels.

The illustrated optical wavelength selective device may also include a phase control element. This phase control element may be arranged in any one of a number of different ways. A number of conceivable ways of arranging the phase control element have been dealt with under the heading Summary of the Invention and are known to one of normal skill in this field and will not therefore be described in more detail in this document.

Figure 2:
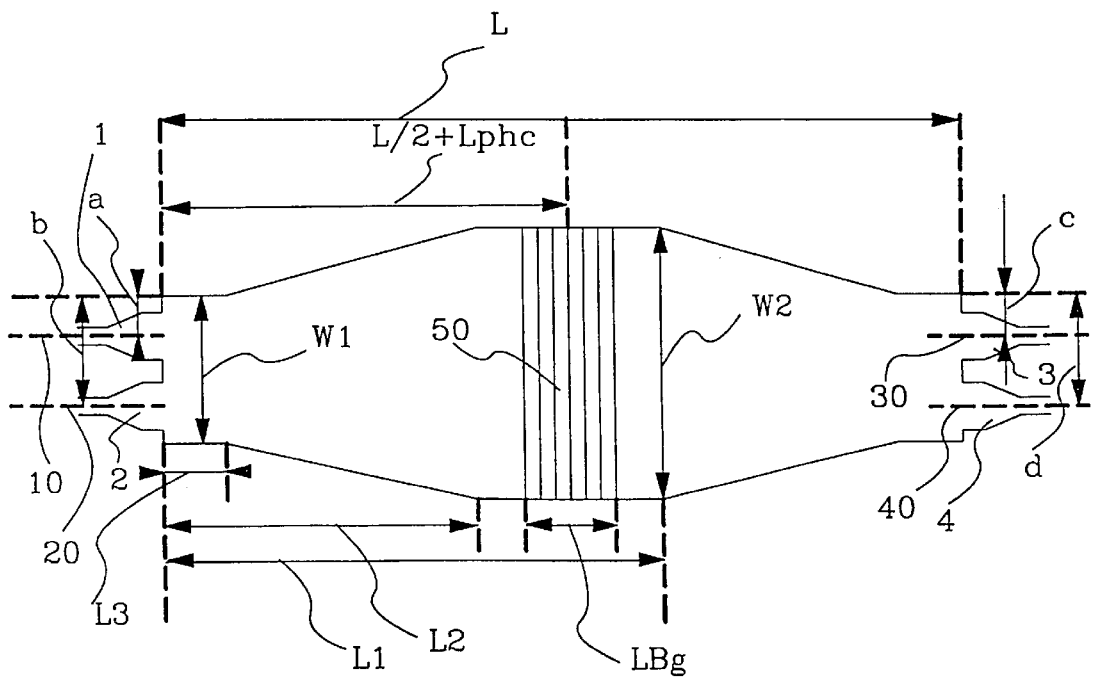
FIG. 2 illustrates another embodiment of an inventive optical wavelength selective device.

FIG. 2 illustrates another embodiment of the inventive optical wavelength selective device. As with the earlier described embodiment, the FIG. 2 embodiment includes a Bragg-grating 50 and an MMI-waveguide. The width of the Bragg-grating is referenced LBg. The length of the MMI-waveguide is referenced L, as in the case of the afore described embodiment. The difference between this embodiment and the first embodiment resides in the form of the MMI-waveguide. The waveguide is tapered, similar to the access waveguides 1, 2, 3 and 4. The long sides of the MMI-waveguide are mutually parallel for a short distance on both sides around the Bragg-grating in the longitudinal direction of the MMI-waveguide and orthogonal to an imaginary centre line in the longitudinal direction of the MMI-waveguide. The width of the MMI-waveguide immediately adjacent the Bragg-grating is referenced W2. The width of the short sides of the MMI-waveguide is referenced W1, where W1<W2.

As will be evident from FIG. 2, the MMI-waveguide may include a final part having a length L3. In another embodiment, the length L3 may be equal to zero. The structure is tapered between the width W1 and W2 of the MMI-waveguide. The taper structure may be linear, parabolic or some other shape. In the illustrated case, the object of the taper structure is to reduce the difference between the propagation modes and therewith reduce the difference in the so-called effective penetration depth of the reflected modes in the grating.

Access waveguides 1, 2, 3 and 4 are arranged on the short sides of the MMI-waveguide. In the FIG. 2 embodiment, two such access waveguides are arranged on each short side. The centre lines 10, 20, 30 and 40 of respective access waveguides 1, 2, 3 and 4 have been shown in the Figure, as in the illustration of the former embodiment. The distance from one end of the short side to the centre line 10 of the access waveguide 1 is referenced a. The distance from the same one end of the short side to the centre line 20 of the access waveguide 2 is referenced b. Similarly, the distances of the remaining access waveguides from the other short side are referenced c and d. The distances a and c may be equal, and the distances b and d may also be equal. As mentioned with reference to the former embodiment, the Bragg-grating may either be arranged in the centre of the MMI-waveguide or may be offset slightly from said centre. The Bragg-grating is offset from the centre of the waveguide for precisely the same reason as that mentioned with reference to the former embodiment, in other words in order to compensate out any mode-dependent phase shift.

Figure 3:
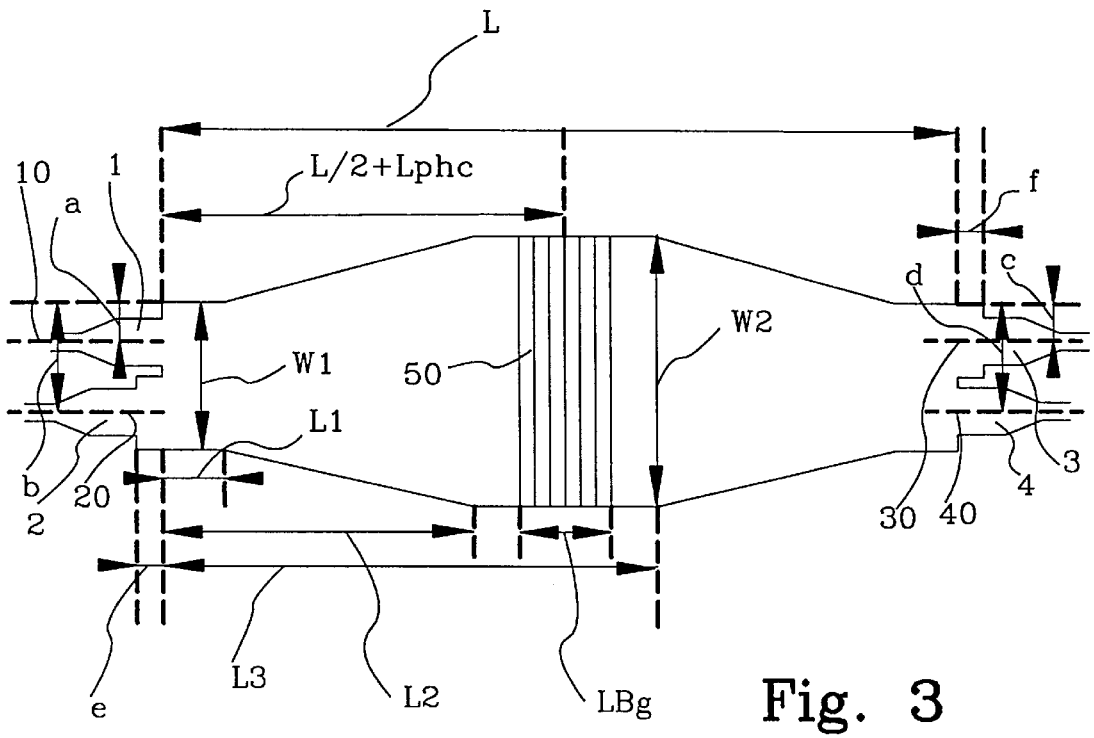
FIG. 3 illustrates a further embodiment of an inventive optical wavelength selective device.

FIG. 3 illustrates another embodiment of an inventive optical wavelength selective device. The only difference between this embodiment and the FIG. 2 embodiment is that the optical so-called pathlength has been in respect of a number of access waveguides. In the FIG. 3 embodiment, the optical pathlength has been extended for access waveguides 2 and 3, by arranging the waveguides on an outwardly projecting part of the MMI-waveguide. The width of these outwardly projecting parts has been referenced e and f respectively in FIG. 3. The distances e and f may be equal or different, depending on the desired result. It is, of course, possible to arrange any of the access waveguides, one or more of said waveguides, on some form of means on the MMI-waveguide that will change the optical pathlength. The purpose of changing the pathlength of given access waveguides is to compensate for mode-dependent phase shifts. If we assume that the length L of the MMI-waveguide corresponds to a so-called cross-mode, it is possible to obtain a so-called bar-mode by increasing the length of the MMI-waveguide to 2L. As the term infers, by cross-mode is meant a mode in which at least one wavelength channel incoming from one side of the MMI-waveguide is transmitted through the MMI-waveguide so as to be focused on an access waveguide on the other side of the MMI-waveguide that is offset laterally in relation to the access waveguide from which the signal exited. An example of a cross-mode is when a wavelength channel is transmitted from access waveguide 10 and focused on access waveguide 40. By bar-mode is meant that a wavelength channel is transmitted from one access waveguide on one side of the MMI-waveguide and focused on a corresponding access waveguide disposed on the other side of said MMI-waveguide. An example of a bar-mode is when a wavelength channel is transmitted from access waveguide 10 and focused on access waveguide 30.

Figure 4:
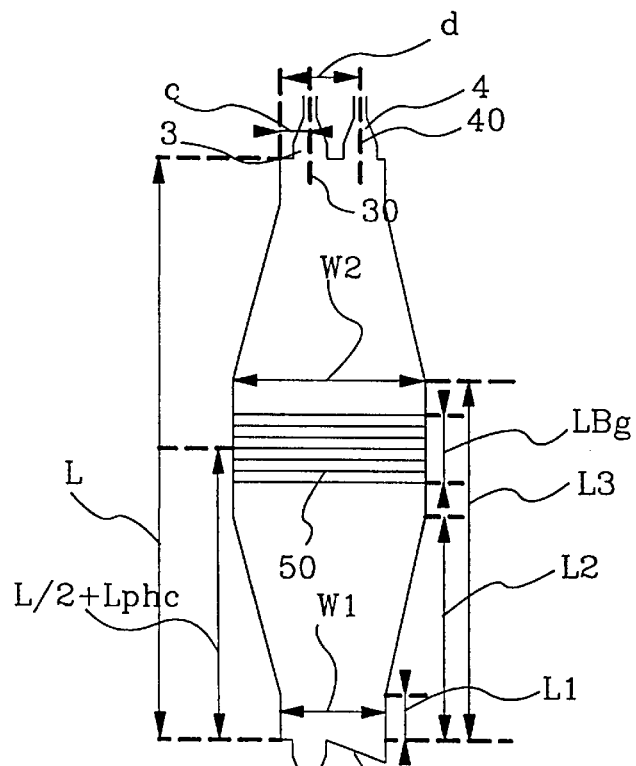
FIG. 4 illustrates still another embodiment of an inventive optical wavelength selective device.
Figure 4:
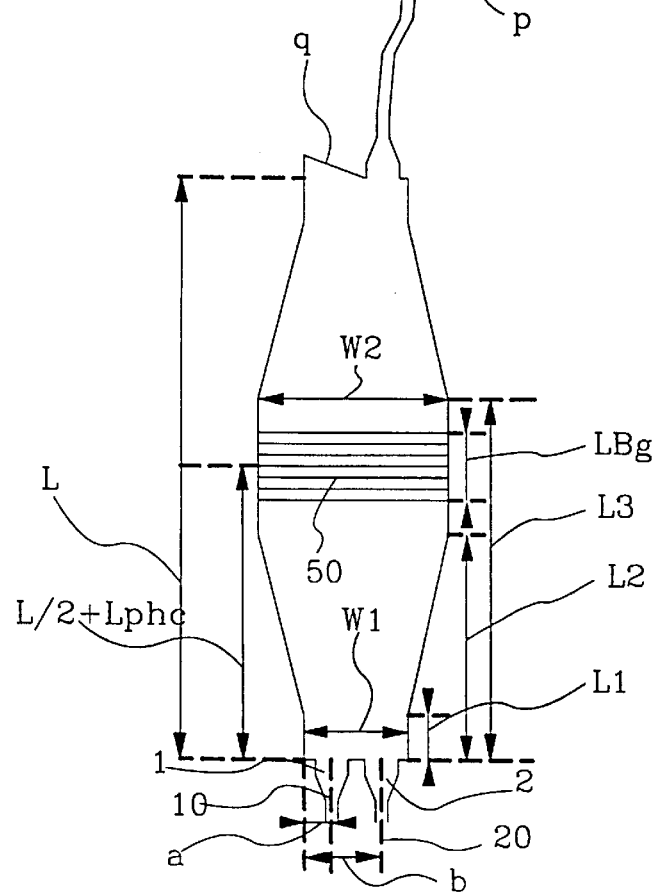

FIG. 4 illustrates a further embodiment of an inventive optical wavelength selective device. In this embodiment, two MMI-waveguides are arranged one after the other. The MMI-waveguides have been joined together either by a waveguide or by an optical fibre. The structure of respective MMI-waveguides is essentially similar to the structure shown in FIG. 2, except at the ends at which they are joined together. It will be seen from FIG. 4 that these ends include only one access waveguide. Furthermore, a part p, q of respective short sides does not lie orthogonal to the centre line of the access waveguide. The reason for this is to enable undesirable light in the MMI-waveguide to be refracted at this part of the structure and disappear therefrom. A cascade of two sequentially arranged MMI-waveguides has the effect of reducing cross-talk. It is also feasible to include in this embodiment a phase control element of the kind mentioned in the Summary of the Invention. Any required number of access waveguides may be arranged on the two MMI-waveguides, although the access waveguides will preferably be two in number on one side and two in number on the other, opposite side. As evident from the Figure, the Bragg-grating may be offset from the centre of the MMI-waveguide, or may be arranged in the centre of said waveguide.

Figure 5:
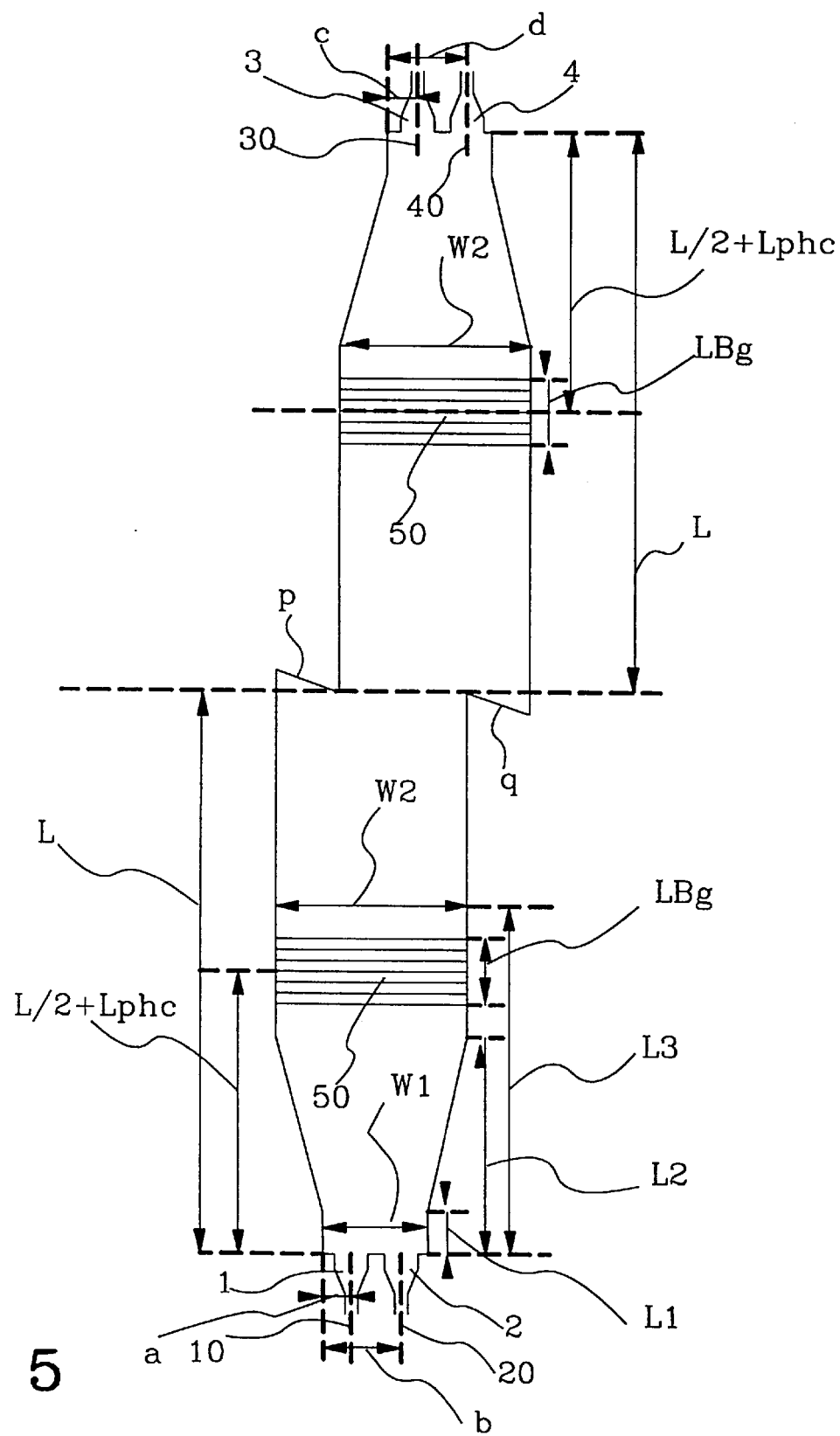
FIG. 5 illustrates yet another embodiment of an inventive optical wavelength selective device.

FIG. 5 illustrates another embodiment of an inventive optical wavelength selective device in which two MMI-waveguides have been directly combined.

As will be seen from FIG. 5, the MMI-waveguide of this embodiment is tapered solely on the side on which the access waveguides are arranged. The respective long sides of the MMI-waveguides are mutually parallel between the two Bragg-gratings. The centre line of one MMI-waveguide is laterally offset in parallel in relation to the centre line of the other MMI-waveguide. In order to eliminate undesirable light reflections in the MMI-waveguides, the parts p and q have been angled on respective MMI-waveguides, said parts being left over in the aforesaid lateral parallel displacement of said centre line so to speak. This embodiment may also include a phase control element of the kind mentioned under the heading Summary of the Invention. Any desired number of access waveguides may be arranged in the free ends of respective MMI-waveguides, a practical limit with respect to this number being determined by the dimensions of the MMI-waveguides.

Figure 6:
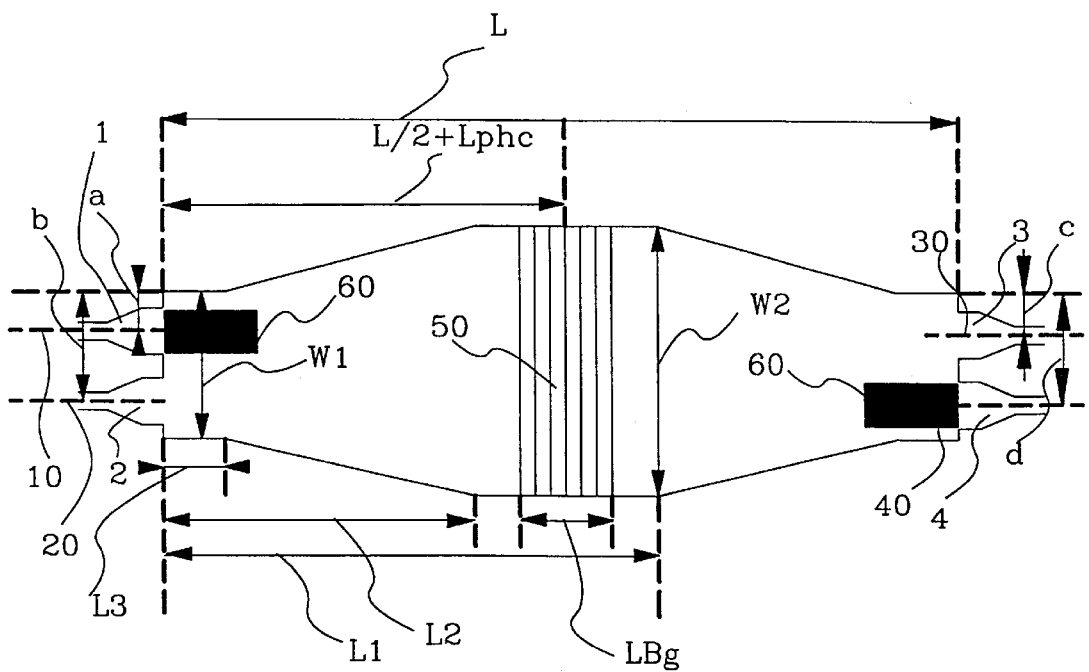
FIG. 6 illustrates still another embodiment of an inventive optical wavelength selective device.

As an alternative to arranging the access waveguides on the aforesaid outwardly projecting parts, the refractive index of the MMI-waveguide can be changed in connection with suitable access waveguides while achieving the same effect, that is to say, change the optical pathlength within the MMI-waveguide with the purpose of compensating for mode-dependent phase shifts. This alternative is illustrated in FIG. 6. In this embodiment, the refractive index of the MMI-waveguide has been increased in a rectangular area 60, immediately adjacent a pair of access waveguides with the longitudinal centre line of the rectangle coinciding with the centre lines of respective access waveguides. This change in refractive index can be achieved by transforming existing material in the MMI-waveguide by UV writing, for instance.

The form and dimensions of said refractive index change are decisive in achieving this effect.

The inventive device may suitably be produced from such materials as quartz ($SiO_2$), polymeric materials, some semiconductor system, or lithiumniobate ($LiNbO_3$), although preferably quartz is used.

It will be understood that the invention is not restricted to the afore described and illustrated exemplifying embodiments thereof and that modifications can be made within the scope of the following claims.

What is claimed is:
1. An optical device comprising:
   at least one MMI-waveguide;
   at least one Bragg-grating structure;
   at least one access waveguide located at a first side of the MMI-waveguide; and
   at least one access waveguide located at a second side of the MMI-waveguide, said first and said second sides being short sides of said MMI-waveguide, the Bragg-grating structure being located in the MMI-waveguide, wherein the optical device includes at least two MMI-waveguides each having one of said Bragg-grating structures located therein, wherein said first side is a side of a first MMI-waveguide of the at least two MMI-waveguides and said second side is a side of a second MMI-waveguide of the at least two MMI-waveguides, a second side of the first MMI-waveguide and a first side of the second MMI-waveguide being coupled.

2. An optical device according to claim 1, wherein the second side of the first MMI-waveguide and the first side of the second MMI-waveguide are laterally offset in relation to one another.

3. An optical device according to claim 2, wherein the first MMI-waveguide has a taper structure on each side of the Bragg-grating structure located in the first MMI-waveguide, and the second MMI-waveguide has a taper structure on each side of the Bragg-grating structure located in the second MMI-waveguide.

4. An optical device comprising:
   at least one multi-mode interference waveguide having a first longitudinal end portion and a second longitudinal end portion located opposite from said first longitudinal end portion;
   at least one Bragg-grating structure located in an interior portion of said multi-mode interference waveguide;
   at least a first tapered access waveguide located at said first longitudinal end portion; and
   at least a second tapered access waveguide located at said second longitudinal end portion,
   wherein said at least one multi-mode interference waveguide includes a first multi-mode interference waveguide and a second multi-mode interference waveguide, and said at least one Bragg-grating structure includes a first Bragg-grating structure and second Bragg-grating structure, said first Bragg-grating structure being located in an interior portion of said first multi-mode interference structure, and said second Bragg-grating structure being located in an interior portion of said second multi-mode interference waveguide.

5. An optical device according to claim 4, wherein said first multi-mode interference waveguide is coupled to said second multi-mode interference waveguide.

6. An optical device according to claim 5, wherein said first multi-mode interference waveguide is coupled to said second multi-mode interference waveguide by at least one of a waveguide and an optical fiber.

7. An optical device according to claim 5, wherein said first multi-mode interference waveguide is coupled to said second multi-mode interference waveguide with means for directly combining waveguides.

8. An optical device according to claim 5, wherein said first multi-mode interference waveguide includes a longitudinal axis that is offset from a longitudinal axis of said second multi-mode interference waveguide.

* * * * *